April 10, 1962 M. W. HARKE ET AL 3,028,945
METHOD AND APPARATUS FOR MANUFACTURING
REFRIGERATOR CABINETS OR THE LIKE
Filed Sept. 29, 1960 4 Sheets-Sheet 1

INVENTORS
MARTIN W. HARKE AND
ROBERT J. SMITH
BY
Andrew S. Hubbard
ATTORNEY

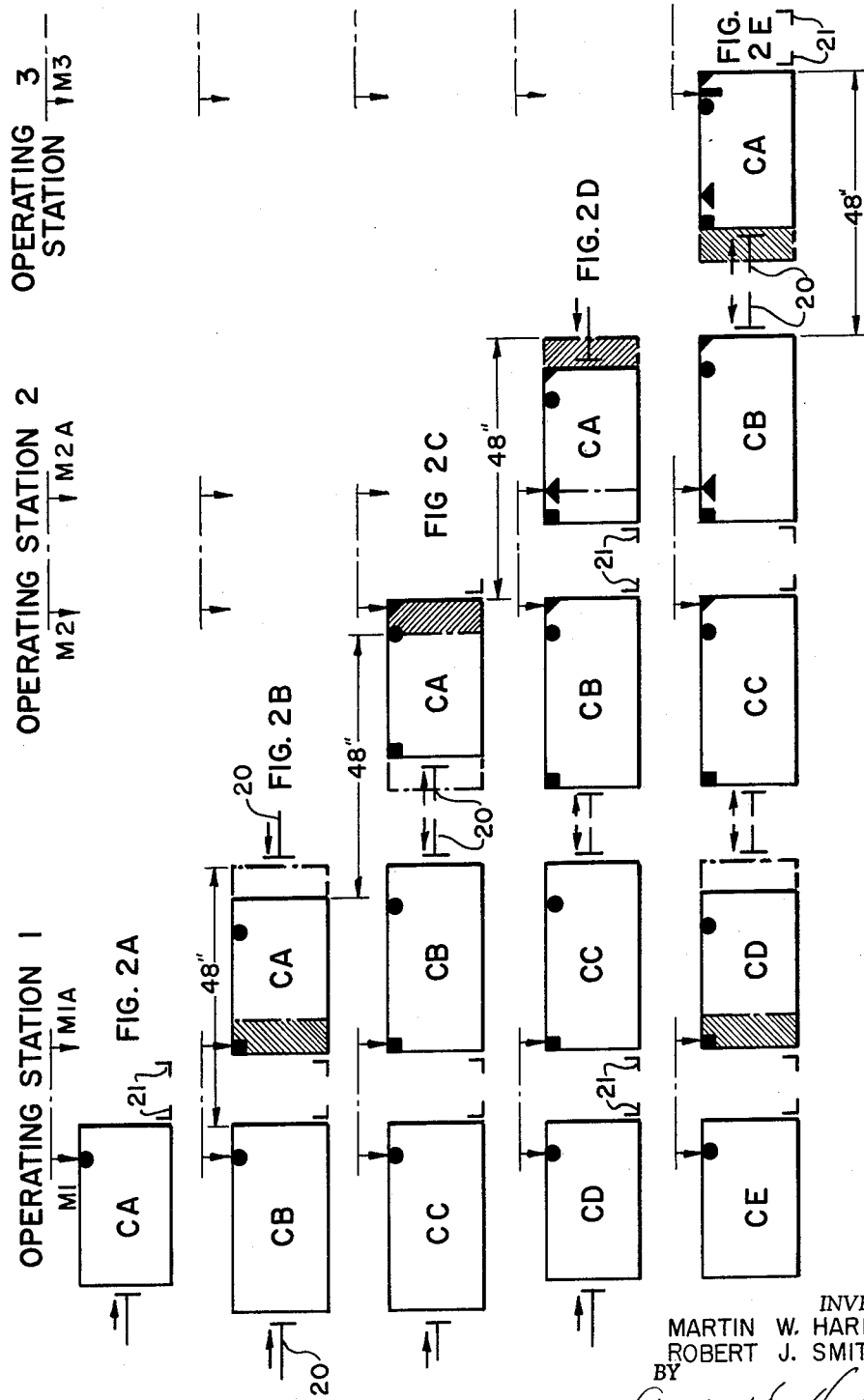

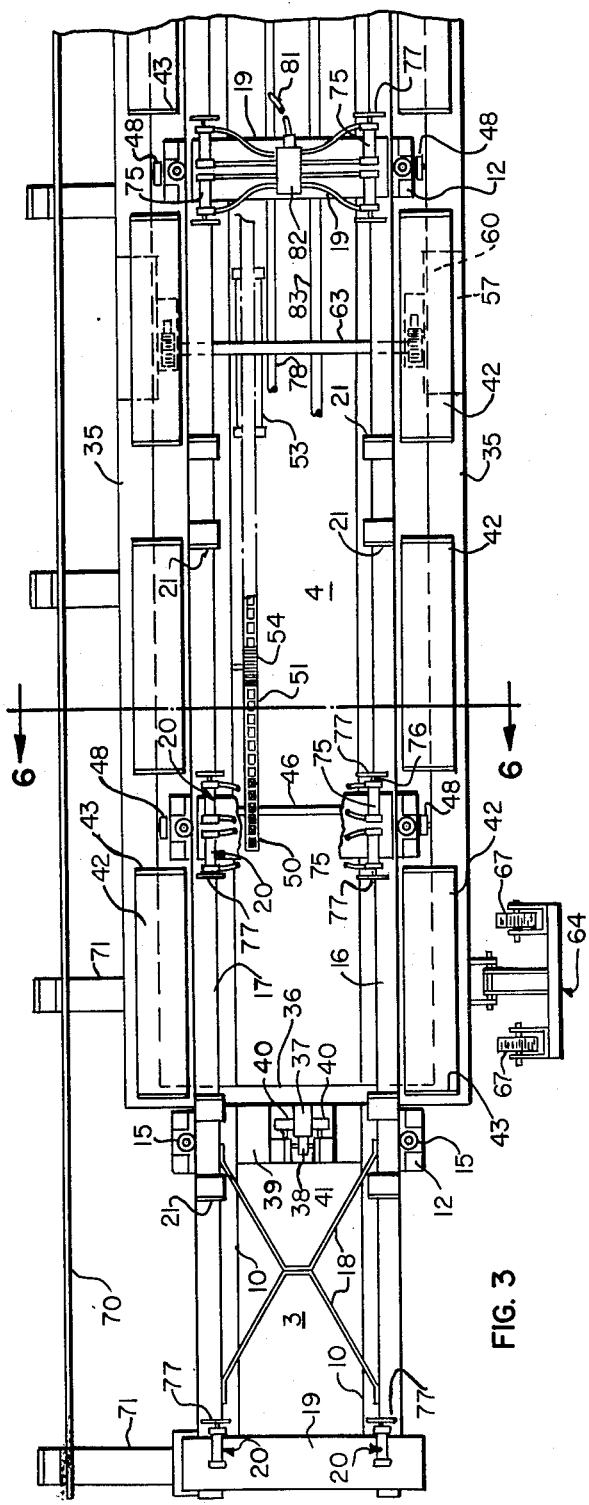
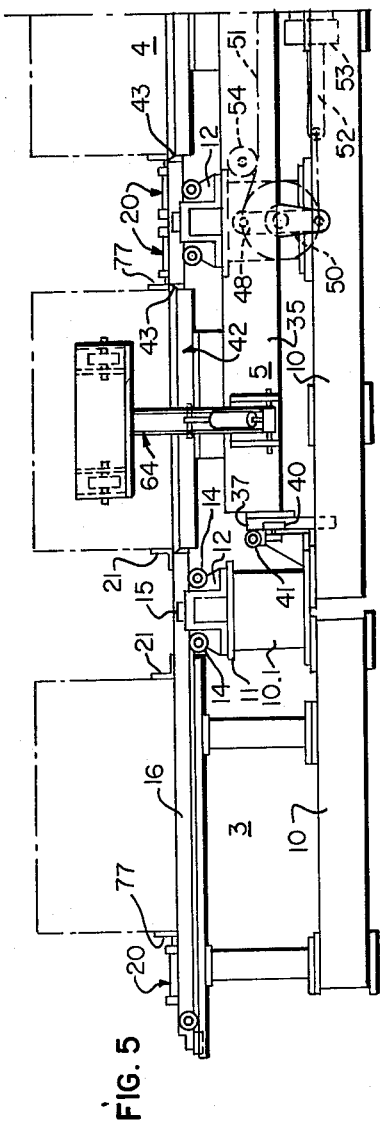
FIG. 3
FIG. 5
INVENTORS
MARTIN W HARKE AND
ROBERT J SMITH
BY
Andrew B. Hubbard
ATTORNEY INVENTORS
MARTIN W. HARKE AND
ROBERT J. SMITH
BY
Andrew G. Hubbard
ATTORNEY United States Patent Office 3,028,945
Patented Apr. 10, 1962

3,028,945
METHOD AND APPARATUS FOR MANUFACTURING REFRIGERATOR CABINETS OR THE LIKE
Martin W. Harke, Lombard, and Robert J. Smith, Villa Park, Ill., assignors to General Electric Company, a corporation of New York
Filed Sept. 29, 1960, Ser. No. 59,221
12 Claims. (Cl. 198—19)

This invention relates to manufacturing methods and apparatus and, in particular, to methods and apparatus to facilitate the manufacture of articles such as refrigerator cabinets of varying sizes. More specifically, our invention provides for performing mechanical operations on a succession of refrigerator cabinets which may vary one from the other in one or more basic dimensions, without interrupting the performance of the apparatus to make changes or alterations to accommodate the different cabinet dimensions.

It should be understood that in the accompanying description of the method and apparatus comprising our invention, reference to refrigerator cabinets or casings is by way of example only, for it will be obvious that our method and apparatus can be used in the manufacture of other structures which are similar in shape and in the operations to be performed thereon, but different from each other in width, height, or depth. With respect to refrigerators, it is well known that in any one model year a refrigerator manufacturer will have in his line refrigerators in which the cabinets are of several sizes to provide several sizes of refrigerators as respects the storage capacity thereof. Further, all of the cabinets will have the same basic structure. For example, the cabinet will have an outer casing comprising a sheet of metal bent into the shape of a square U, to which is affixed a back panel, a bottom panel, supporting structure such as gussets, etc. These elements are all similarly located in the various cabinet sizes and are usually welded in position. The cabinets have other elements for which the necessary work operations are common to all sizes. They require, for example, embossing, punching and similar mechanical operations to prepare the cabinets for the attachment of latches, hinges and other auxiliary hardware.

It is good manufacturing practice to standardize on the work operations to a maximum extent and the product designer will endeavor to place basic structural elements, cabinet hinge locations, etc., in the same position relative to a common base line of the cabinet regardless of the overall width or depth of the cabinets. Nevertheless, prior to the present invention the automated apparatus for performing the necessary mechanical operations did not automatically adjust itself or otherwise conform to the varying requirements of a variety of cabinet sizes. The apparatus was set up to accommodate a specific cabinet size and when a run of such cabinets was completed it was necessary to shut down the line and rearrange the tools at the several machine stations. The present invention eliminates this "down time" and provides an apparatus in which means automatically accommodate a run of cabinets regardless of the fact that in the same run the cabinets may vary one from the other in height, width or depth. The invention, therefore, makes it possible continuously to process a series of cabinets without regard to the dimensional changes thereof, even though cabinets of varying sizes may be in haphazard sequence considered with respect to any particular run of work.

In brief, our invention resides in mechanism for uniformly advancing a series of cabinets from one to the next of a succession of work stations at which work is done on only one side or corner location of a cabinet at one time, and the operative association with such work stations of means whereby the cabinets are advanced in pairs so that a pair of cabinets is presented to each work station. Each work station includes machines which, instead of working on both sides of a single cabinet, for example, work on adjacent sides of two cabinets as they travel in pairs along the line of operation. Work operations at the respective stations are carried out in timed relation to a shuttle mechanism which conducts the cabinets to the successive stations.

In the presently preferred embodiment of the invention a shuttle is provided with a series of pairs of indexing devices spaced apart slightly more than the widest cabinet to be accommodated in the run. Each of the cabinets in the line occupies a position on the shuttle in which either a leading wall or a trailing wall of a cabinet will engage with an indexing device. As the pairs of cabinets are brought to each work station a pusher automatically moves the cabinets relative to each other so that the trailing edge of the forwardmost cabinet is positioned against the indexing device and the forward edge of the next succeeding cabinet is positioned against an indexing device. The machines at the operating station, therefore, simultaneously perform the work operation with reference to the trailing edge of the first cabinet and the leading edge of the second cabinet, whereupon the cabinets are advanced to the next operating station. At this station machines will respectively operate on the trailing edge of the first cabinet and on the leading edge of the second cabinet, whereas at the first operating station the machines will be operating respectively on the trailing edge and the leading edge of the next cabinets coming along the line. In this way, by the time the pair of cabinets has transversed two operating stations the necessary work operations will have been performed with respect to both the leading edge and the trailing edge of a cabinet. By reason of the automatic indexing device the cabinets will have been properly positioned relative to the operating machines regardless of any difference in width of the respective cabinets.

It is a specific feature of the presently preferred embodiment that means are provided also to adjust the cabinets transversely on the line of movement and in a vertical direction, whereupon by means of suitable indexing devices against which the cabinets are urged, accommodation may be made for cabinets of varying length and height.

In the accompanying drawings, FIG. 1 is a schematic perspective showing our invention in operation;

FIGS. 2A through 2E are diagrammatic representations showing the positioning of the cabinets as they progress from one to the next of the work stations;

FIG. 3 is a fragmentary plan view of the apparatus;

FIG. 5 is a fragmentary side elevation;

Figure 1:
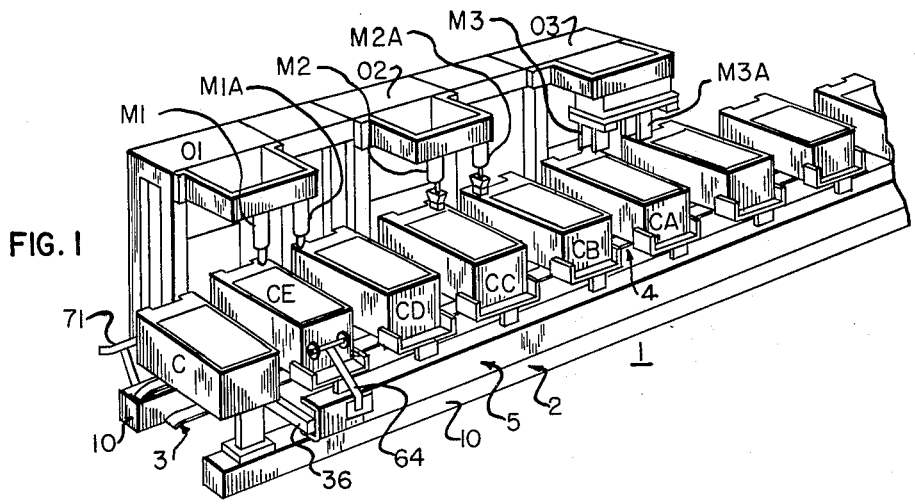

FIG. 1 shows apparatus having three operating positions of two work devices each, although it will be understood that there may be any necessary number of stations according to the extent and variety of the work operations to be carried out on the refrigerator cabinets or the like. The apparatus 1, which comprises a main base or bed frame 2, a loading station 3, a shuttle 4 (FIGS. 3 and 5), and an elevator 5, is described in greater detail hereinafter. The machine group includes operating stations O1, O2, and O3 at which are the respective work devices or machines M1 and M1A, M2 and M2A, and M3 and M3A. No specific operational function will be identified with any of these machines for they will be selected according to the work operations to be performed on the cabinets as they progress along the apparatus.

FIG. 1 shows the operational status of the apparatus corresponding generally to FIG. 2E, except that the latter figure does not include the cabinet C at the loading station and does not include machine station M3A or the cabinet being worked on at said station.

FIG. 2A represents the apparatus at the start of a run in which a cabinet CA has been advanced from the loading station to the first of the work devices M1 at operating station O1. As later described in detail, the cabinet CA has been propelled manually or by an air-operated positioner presently described to the proper index position on the shuttle 4, which then advances the cabinet to machine M1 whereupon mechanism affiliated with the elevator 5 places the cabinet in proper vertical and lateral relationship for the work devices M1 to function. In the meantime, the shuttle 4 returns to its pickup position to accept the next cabinet, CB. After the machine operation, the elevator returns cabinet CA to the shuttle which advances it and the newly positioned cabinet CB a fixed extent. As presently adjusted for cabinets of the largest size now manufactured by applicants' assignee herein, the shuttle advance is 48″. It will be noted from FIG. 2B that cabinet CA is narrower than cabinet CB so that the uniform advance of the shuttle which has placed cabinet CB in proper relationship to work device M1 has advanced cabinet CA too far to be worked upon by machine M1A. At this time, or actually during the advance of the shuttle, automatic pusher devices move cabinet CA to the left as viewed in FIG. 2B until its trailing edge abuts the operating position index, whereupon both cabinets CA and CB are now properly prepared for the operation of machines M1 and M1A. In FIG. 2B the extent of overtravel of cabinet CA is indicated by broken lines and by the light shading at the left-hand portion of CA. The work operation performed by machine M1 is indicated by a dot, and that performed by M1A by a rectangle. At condition 2B, therefore, cabinet CA has had both of the operating station O1 machines work on it, whereas CB has encountered only machine M1. FIG. 2C shows the third advance in which cabinet CA has been transported to the second operating station and a new cabinet CC has been presented to machine M1. Again, in view of the relatively smaller size of cabinet CA, the uniform advance of the machine has left cabinet CA short of proper operating relationship to machine M2 at the operation station O2, whereupon positioner devices disposed on the shuttle intermediate cabinets CA and CB, additionally advance cabinet CA to the right until it is properly indexed for operation station O2, and urges cabinet CB to the left. It will be recalled that cabinet CB is a maximum width cabinet and the positioner device urges it only a very short distance before the cabinet is properly indexed.

It will be noted in this connection that the positioner devices, later described, are low pressure pneumatic pistons which will stall without damage to the cabinet when a cabinet has been brought against an indexing member. In similar fashion, FIG. 2D shows that at the next operating station cabinet CA will have been moved too far, and must be positioned to the left for proper indexing at work device M2A in FIG. 2E. The relationship of the five cabinets then on the machine is shown, as well as the progression of the work identified respectively by the differing symbols as the cabinets attain the third operating station.

The bed frame 2 (FIG. 6) which comprises the longitudinal rails 10, has at appropriate intervals standards 10.1 supporting outriggers 11. Said outriggers accommodate bearing mounts 12 on which are mounted pairs of roller bearings 14 operating on horizontal axis and roller bearing 15, operating on a vertical axis. These groups of bearings, which are disposed symmetrically with respect to the two sides of the bed frame, provide anti-friction support and guide means for the shuttle mechanism 4, whereby the shuttle is mounted for low-friction travel along an accurately guided path. The shuttle mechanism includes spaced parallel rails 16 and 17 secured on to the other at appropriate intervals by any suitable structure such as the members 18 in suitably arranged cross-braced fashion to maintain the rails 16 and 17 in parallel relationship. Other cross members 19 suitably fastened to the top of the rails 16, 17 support the pairs of pushers 20 later described in detail. The rails 16 and 17 also carry the work indexing guides 21 against which the cabinets are urged by the pushers 20 to effect the proper positioning of cabinets relative to the work stations regardless of the width of the cabinets.

Figure 4:
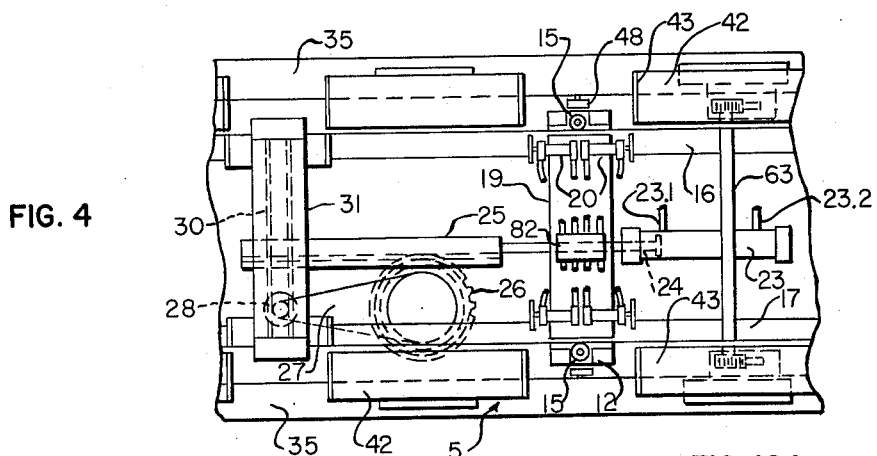
FIG. 4 is another fragmentary plan view showing the shuttle drive mechanism.

The means for effecting a reciprocating movement of the shuttle, as shown in FIG. 4, comprises the hydraulic cylinder 23 suitably fixed to the bed frame and having a piston and piston rod 24 to the free end of which is secured a rack 25 appropriately guided by bearing means (not shown). Rack 25 is in continuous mesh with a gear 26 arranged for free rotation on a vertical shaft (not shown) appropriately mounted in the bed frame. The gear fixedly carries an arm 27 terminating in a roller bearing 28 which rides between the flanges of an inverted channel 30 secured to a cross member 31 of the shuttle, it being understood that the channel web is fastened to the cross member, whereupon the channel openly faces in a downward direction. Obviously, therefore, as the piston and rod 24 are reciprocated within the cylinder 23 as later described, gear 26 and its arm 27 will oscillate and the cooperation of bearing 28 and the channel 30 will effect a reciprocation of the shuttle 4. The piston stroke, rack-to-gear ratio, and effective length of arm 27 are such that the movement of shuttle 4 in each direction is 48″.

The purpose of the shuttle is to transport the cabinets in step-by-step fashion from one machine station to the next. At each of the stations, the work is lifted from the shuttle, whereupon the shuttle returns for the next pickup and advance of cabinets thereon.

Figures 8, 9:
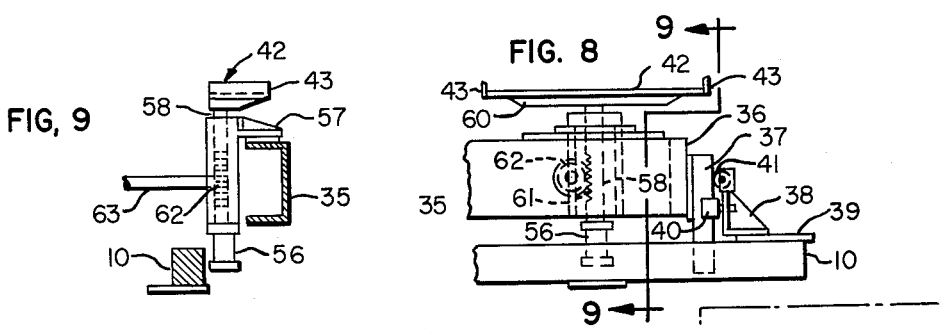
FIG. 8 is a fragmentary end elevation taken at one end of the elevator to show the supplemental lifting mechanism at one of the cradles.
FIG. 9 is a sectional elevation taken on lines 9—9 of FIG. 8.
Figure 6:
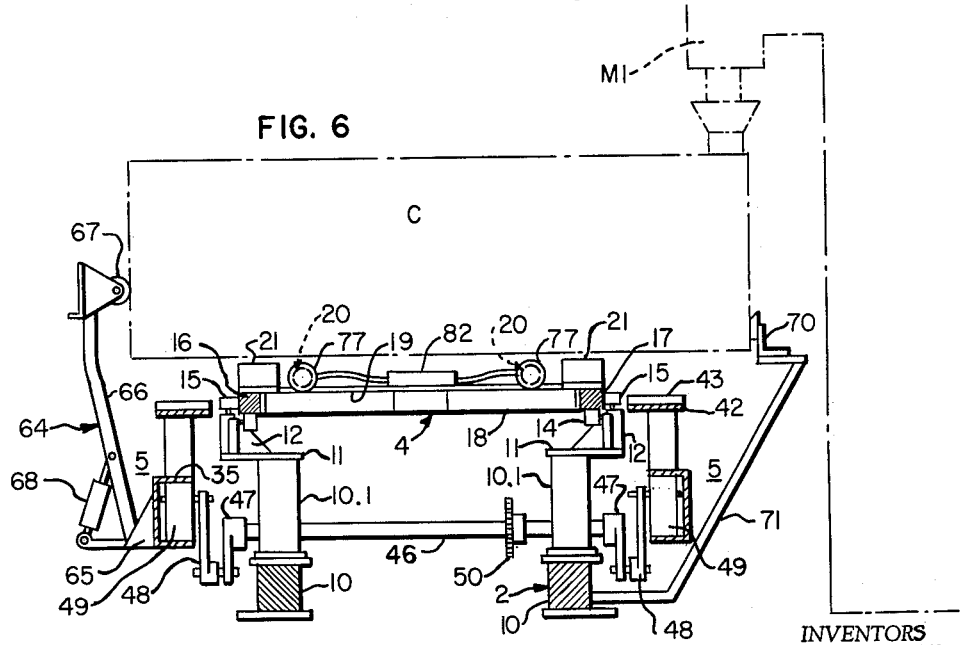
FIG. 6 is a sectional end elevation looking ni the direction of the arrows 6—6 of FIG. 3.

The elevator 5 essentially comprises a box frame having side rails 35 and end rails 36. These rails are advantageously formed of channel members. The frame is guided for true vertical motion by means disposed in fixed relation to the bed frame rails 10. As shown in FIGS. 3 and 8 a vertical guide rail 37 is mounted centrally of each elevator end member 36 and a bracket 38 is fixedly supported on a transverse base frame member 39. This bracket mounts horizontal axis rollers 40 which operate against the sides of the rail 37 and a roller 41 which engages with the end of said guide rail. By these means the elevator 5 is constrained to move in a fixed vertical path. At intervals appropriate to the spacing of the work stations, each of the elevator side rails 35 has structure mounting a cradle 42 having angle members 43 at each end. Members 43 are spaced to accommodate between them the widest of the cabinets to be operated on. At each of the operating stations mutually opposite cradles engage a cabinet as the elevator rises, and lift the cabinet to the operative position required by the particular work device or work operation at the work station. The main elevator system accomplishes a fixed lift which may or may not be sufficient to establish the cabinet at working height, depending on the depth of a particular cabinet. As shown in FIG. 6, a shaft 46 is journalled in standards 10.1 of the bed frame near each end of the elevator 5. At each outboard end each shaft 46 has secured thereon a crank arm 47 which in turn pivotally carries a second crank arm 48 pivotally mounted in bearing structure 49 provided at each side rail 35. A sprocket 50 fixed to each shaft 46 accommodates a sprocket chain 51 which at each of its ends is secured to the double ended piston rod 52 of a piston (not shown) operating within the hydraulic cylinder 53 suitably fixed within the bed frame. Any suitable idlers 54 (FIG. 7) may be used to maintain the proper chain tension. It will be obvious that the movement of the piston within cylinder 53 as established by the introduction of hydraulic fluid through one or the other of the conduits 55, 55.1, will appropriately rotate the sprocket 50 to accomplish the lifting or lowering of the elevator 4. The arms 47 and 48 can, of course, provide only a fixed amount of lift which as previously noted may be insufficient for all cabinet sizes being operated on at certain of the work stations. It should be understood that at some of the work stations the fixed lift may be satisfactory for even the smaller depth cabinets for there are certain manually guided operations such as grinding, etc. which are obviously under control of the workman. At other work stations, however, it is necessary to bring the upper edges of the cabinet into precise registry with an upper datum line. Accordingly certain of the elevator cradles 42 are arranged for additional lift. As shown in FIGS. 8 and 9, the supplemental lifting devices comprise cylinders 56 supported by brackets 57 on the inner portions of the side rails 35. Each cylinder piston rod 58 is guided within the bracket and terminates in a fixture 60 which carries the cradle 42. There is a piston assembly at each side of the elevator 4 and it is essential that the cradles carried on the respective piston rods 58 rise equally to maintain an exact horizontal position of the cabinet carried thereby. Therefore, the opposite piston rods at the respective cradle lifting mechanisms are mechanically associated with each other by forming each piston rod with a rack 61 which cooperates with a pinion 62 fixed on a shaft 63 journalled in brackets 57. By accurately aligning the shaft bearings in each of the opposite brackets 57 and also bringing the racks 58 and pinion 62 into exact registry, it will be seen that the cradles 42 on the opposite sides of the elevator will rise or fall in exact relationship, for neither piston can lag or lead the other.

It will be understood that whereas the main elevator mechanism must accommodate the full load of the elevator and the cabinets placed thereon each of the pairs of supplemental lifting devices handle only a single cabinet. The pistons can, therefore, operate successfully on but two or three pounds per square inch air pressure and will elevate the cradled cabinet until the cabinet engages an abutment at the work device whereupon the pistons will stall without harmfully stressing the cabinet.

The elevator is also equipped to make a transverse cabinet adjustment to bring a common reference point of each cabinet—for example, an end wall of the cabinet—into proper position below the work device so that the rising elevator will bring the cabinet into exact relationship with the machines at the work stations. It is necessary to make this lateral adjustment only at the first machine station because all subsequent travels of the cabinet from one to the next of the operating stations are rectilinear and precisely controlled. Also, certain of the machines at the work stations, particularly where welding operations are present, engage the cabinets and inherently make a final adjustment of them with respect to the mechanism. At the first of the work stations, therefore, the elevator is equipped with a pneumatically operated crowder 64 mounted as shown in FIG. 6 on one of the elevator rails 35. For example, the crowder comprises a bracket 65 on which is pivotally mounted an arm 66 having a head which includes spaced rollers 67, the axes of which are precisely parallel to the line of travel of the cabinets. A pneumatic motor assembly 68 is arranged to rotate arm 66 clockwise of FIG. 6, whereupon the rollers 67 engage the cabinet and drive it to the right until movement is interrupted by the fixed guide rail 70 carried by outriggers 71 supported from one of the bed frame rails 10.

Figure 7:
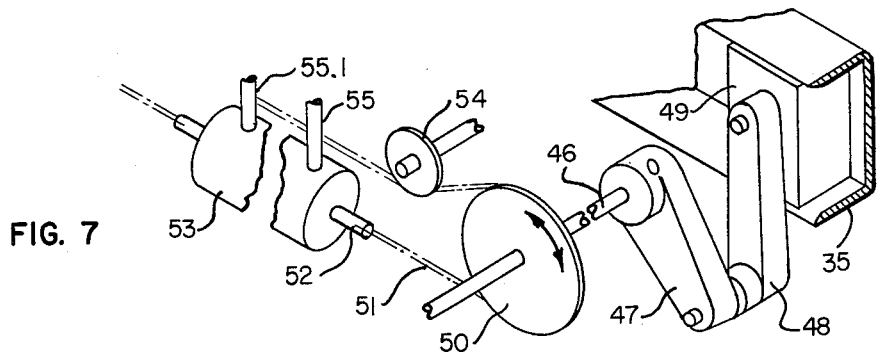
FIG. 7 is a schematic perspective of the main elevator lift mechanism.

It has previously been noted and schematically illustrated in FIG. 2 that the various cabinets are longitudinally adjusted by means of pushers 20. These pushers are mounted on the cross members 19 of the shuttle and except for those at the extreme left end as viewed in FIGS. 3 and 5 are disposed between pairs of cradles 42. The latter pushers are arranged in back-to-back pairs adjacent the shuttle rails. Each pusher comprises a cylinder 75 containing a piston (not shown) from which extends a rod 76 terminating in a head 77. The pushers are preferably air-operated and are supplied from air lines 78 extending the length of the shuttle. From the air line, flexible hoses 81 of length suitable to accommodate the shuttle movement, feed into a connection and valve box 82 individual to the various sets of pushers. By means of hose connections best shown in FIG. 3 the ends of the cylinder 75 are connected to the associated valve box 82 whereupon according to the end of the cylinder into which air is introduced the head of the various pushers may be projected or retracted. As with respect to the auxiliary elevator lifting mechanism, the work performed by the pushers is slight and air pressure in the two to three pounds per square inch range is adequate. The auxiliary lift cylinders 56 may therefore also be supplied from the air line 78. On the other hand, the power required to reciprocate the shuttle and lift the elevator mechanism is substantial and the respective cylinders 23 and 53 are hydraulically operated. A suitable hydraulic line 83 is therefore provided to supply cylinder 23 through valved connections 23.1 and 23.2 (FIG. 4) and cylinder 53 through valved connections 55 and 55.1 (FIG. 7). The valves supplying fluid to the several cylinders have not been shown except in the schematic diagrams of FIGS. 10 and 10A.

Figure 10:
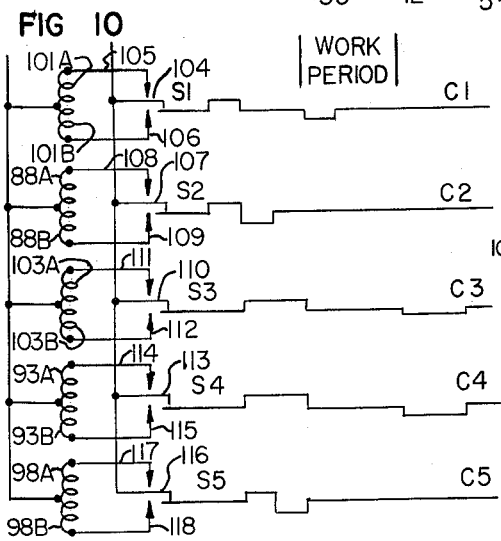
FIG. 10 is a schematic sequence diagram.
Figure 10A:
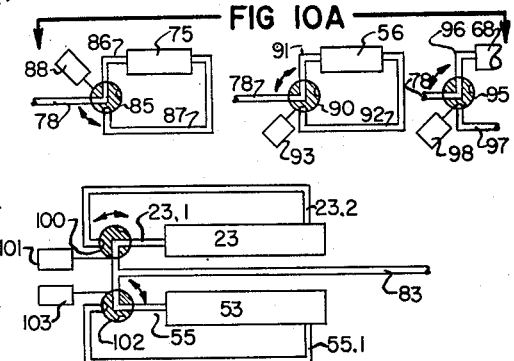
FIG. 10A is a schematic valve diagram.

In FIG. 10A the pneumatic and hydraulic piping for the cylinders serving the shuttles and elevator mechanisms is schematically shown. The single cylinder 75 for the pushers 20 is representative of the fact that the plurality of the cylinders at any operational group are connected in parallel to the air line 78 and that a single three-way valve serves each of the operating groups of pushers. Valve 85, therefore provides connection of the line 78 with either of the conduits 86 or 87 according to the direction of operation of the electromotive device 88. This operating device 88 is of the well-known type in which when the motor is deenergized it assumes a neutral position in which valve 85 is neutral in that it does not connect either of the conduits to the line 78. Valve 85 will have suitable venting means whereby when conduit 86 is supplied with air to urge the pusher piston in one direction, conduit 87 is vented and vice versa.

The elevator cylinders 56 are similarly served by way of the three-way valve 90 which selectively connects cylinder 56 to line 78 by way of conduit 91 or 92 and the operation of its electromotor 93 is similar to that of electromotor 88. Similarly, the crowder cylinder 68 is served by three-way valve 95 which connects the cylinder to line 78 by way of conduit 96 or 97. Its motor 98 is as previously described with respect to motors 88 and 93.

Shuttle-actuating cylinder 23 is served from hydraulic line 83 by way of three-way valve 100 and its motor 101 and the main elevator lift cylinder 53 is served from the hydraulic line by way of three-way valve 102 and its motor 103.

In FIG. 10, C1 to C5 inclusive, represent cams of any conventional timing device (not shown) pursuant to which the rotation of the cams on a single cam shaft is produced by a conventional timer motor (not shown) suitably geared to rotate the cam shaft at the desired rate, whereupon each rotation will comprise one complete operating cycle of the apparatus. It will be understood that the start position is at the left-hand portion of the figure and that the rotation of the five cams will be as though the cam representations are moving to the left of the figure. The cams respectively operate switch S-1 having a switch spring 104 capable of closing with either the top contact 105 or the lower contact 106; switch S-2 having switch spring 107 capable of closing with either the top contact 108 or the lower contact 109; switch S-3 having a switch spring 110 capable of closing with either the top contact 111 or the lower contact 112; switch S-4 having a switch spring 113 capable of closing with either the top contact 114 or the lower contact 115; and switch S-5 having the switch spring 116 capable of closing with either the upper contact 117 or the lower contact 118.

Contacts 105 and 106 are respectively connected to the actuating coils 101A and 101B of the shuttle cylinder valve motor 101; contacts 108 and 109 are respectively connected to the actuating coils 88A and 88B of the pusher valve motor 88; contacts 111 and 112 are respectively connected to the actuating coils 103A and 103B of the main elevator lift valve motor 103; contacts 114 and 115 are respectively connected to the operating coils 93A and 93B of the auxiliary lift valve motor 93; and contacts 117 and 118 are respectively connected to the operating coils 98A and 98B of the crowder valve motor 98.

The cam representations are not intended to convey any particular time interval during which the respective valve motors are energized.

With the circuits in the open position shown, it will be assumed that the valve motors have actuated their associated valves to a condition in which no hydraulic fluid is being supplied to any of the actuating cylinders. To begin the operation, the operator closes a main switch (not shown) for the electrical system. As timer operation begins, switch spring 104 closes with contact 105, whereby coil 101A is energized and motor 101 operates valve 100 to apply hydraulic fluid to the cylinder 23 to drive the shuttle to the right of FIG. 3, thereby presenting the previously loaded cabinet at machine M1 of work station O1. At the same time, switch spring 107 closes with contact 108 to energize the motor coil 88A of valve motor 88. This operates pusher valve 85 as needed to align the cabinet at the work station. It will be noted that coil 101A is energized for the period necessary to effect the full travel of the shuttle in its forward direction following which switch spring 104 returns to open circuit position deenergizing motor 101 so that its valve 100 assumes the previously noted neutral position and the shuttle remains in its forward position. Switch spring 107, however, completes a full operating cycle pursuant to which it drops to close with contact 109 energizing coil 88B of valve motor 88, thus retracting the pusher head to its home position. Following this operation the spring 107 assumes an open circuit condition representing that the pushers are then inactive for the remainder of the single operating cycle.

The shuttle remains stationary to allow the elevator to lift the cabinet to operational position. Consistent with the termination of the shuttle advance therefore, switch spring 110 closes with contact 111 to energize coil 103A of the elevator valve motor 103, whereupon hydraulic fluid is applied appropriately to lift the elevator. Similarly, switch spring 113 closes with contact 114 to energize the upper coil 93A of the auxiliary lift valve motor 93 operating the auxiliary lift pistons to complete the elevation of cabinets which may be at the auxiliary lift stations. Also, switch spring 116 closes with contact 117 to actuate the upper coil 98A of the crowder valve motor 98, whereupon the cabinet at the first operating station will be urged transversely of the elevator into alignment with the rail 70.

It will be observed from the sequence diagram that the main and auxiliary lift valves are maintained in their actuating position during the work period following which they lower the elevator to be in readiness for the next operational cycle.

While there has been described what is at present considered to be the preferred embodiment of the invention, it will be understood that various modifications may be made therein, and it is intended to cover in the appended claims all such modifications as fall within the true spirit and scope of the invention.

We claim as our invention:

1. Apparatus for performing work operations on refrigerator cabinets or the like, which may differ one from the other in length, width or height, comprising, in combination, a succession of work stations having a fixed spacing one from the other in single file, a conveyor system extending parallel to and coextensive with said line of work stations, said system being arranged to receive a series of cabinets commonly oriented relative to the line of work stations, means for operating said conveyor system to advance said series of cabinets in step-by-step fashion from one to the next of said work stations, a first work device at each of said stations for performing a manufacturing operation on a cabinet in predetermined relation to the leading edge thereof, a second work device at each of said stations for performing a manufacturing operation on a cabinet in predetermined relation to the trailing edge thereof, said work devices being located at an elevation above said conveyor greater than the depth of the maximum-depth cabinet to be worked on, and means effective upon completion of each step-by-step advance of the series of cabinets to move certain cabinets in a direction to position the leading edge thereof in fixed relation to the first of the work devices at the respective work stations and to move other cabinets in a direction to position the trailing edge thereof in fixed relation to the second of the work devices at the respective work stations, means effective upon the completion of the last-named movement of the cabinets to move at least the rearmost cabinet of the series transversely of the line of travel of said conveyor to bring said cabinet into a predetermined position relative to the longitudinal axis of the conveyor, and means for lifting all of the cabinets from the conveyor to the extent necessary to bring them into desired operative relation with said work devices while maintaining the relative lateral and transverse position of the series of cabinets one to the other.

2. Apparatus for manufacturing refrigerator cabinets or the like, comprising, in combination, a succession of work stations having a fixed spacing one from the other, a conveyor system extending parallel to and coextensive with said work stations, said system being arranged to receive a series of cabinets in which corresponding walls of the respective cabinets are commonly oriented, means for operating said conveyor system to advance said series of cabinets in step-by-step fashion from one to the next of said work stations, a first work device at each of said stations for performing a manufacturing operation on a cabinet in predetermined relation to the leading edge thereof, a second work device at each of said stations for performing a manufacturing operation on a cabinet in predetermined relation to the trailing edge thereof, a first series of mutually spaced abutments on the said conveyor system for positioning a leading edge of the cabinet successively in predetermined relation to the first work device of the respective stations, a second series of mutually spaced abutments on the said conveyor system for positioning the trailing edge of the cabinets successively in predetermined relation to the second work device of the respective stations, means effective upon completion of each step-by-step advance of the series of cabinets to move certain cabinets into engagement with the abutments of the first series and other cabinets into engagement with the abutments of the second series, and means effective upon the completion of the last-named movement of the respective cabinets to move the same simultaneously in a direction angularly relative to the line of step-by-step travel of said cabinets to bring the cabinets into operative relation to the respective work devices.

3. Apparatus for manufacturing refrigerator cabinets or the like, comprising, in combination, a succession of work stations having a fixed spacing one from the other in single file, a conveyor system extending parallel to and coextensive with said line of work stations, said system being arranged to receive a series of cabinets commonly oriented relative to the line of work stations, means for operating said conveyor system to advance said series of cabinets in step-by-step fashion from one to the next of said work stations, a first work device at each of said stations for performing a manufacturing operation on a cabinet in predetermined relation to the leading edge thereof, a second work device at each of said stations for performing a manufacturing operation on a cabinet in predetermined relation to the trailing edge thereof, and means effective upon completion of each step-by-step advance of the series of cabinets to move the odd-numbered cabinets of the series in a direction to position the leading edge thereof in fixed relation to the first of the work devices at the respective work stations and to move the even numbered cabinets of the series in a direction to position the trailing edge thereof in fixed relation to the second of the work devices at the respective work stations, and means effective upon the completion of the last-named movement of the respective odd-and-even numbered cabinets to move the same simultaneously in a direction vertical to the line of travel of said cabinets to bring the cabinets into desired operative relation to the respective work devices.

4. Apparatus according to claim 3, in which said last-named means includes a first elevator mechanism effective collectively to raise the series of cabinets for a fixed distance sufficient to establish cabinets of certain maximum depth in the desired operative relationship with the work devices, and a second elevator mechanism operable on the cabinets individually to raise any cabinets of less than maximum depth the additional distance to place said cabinets in the said operative relationship.

5. Apparatus for manufacturing refrigerator cabinets or the like, comprising, in combination, a succession of work stations having a fixed spacing one from the other in single file, a conveyor extending parallel to and coextensive with said line of work stations, said system being arranged to receive a series of cabinets commonly oriented relative to the line of work stations, means for operating said conveyor to advance said series of cabinets in step-by-step fashion from one to the next of said work stations, a first work device at each of said stations for performing a manufacturing operation on a cabinet in predetermined relation to the leading edge thereof, a second work device at each of said stations for performing a manufacturing operation on a cabinet in predetermined relation to the trailing edge thereof, each of said work devices being disposed above said cabinets, pusher means on said conveyor between certain work stations to engage with adjacent cabinets of the series to move one of the adjacent cabinets in a direction to position the leading edge thereof in fixed relation to the first of the work devices at the respective work stations and to move the other of the adjacent cabinets in a direction to position the trailing edge thereof in fixed relation to the second of the work devices at the respective work stations, abutment means disposed in laterally spaced parallel relation with said conveyor to establish said cabinets at a predetermined position below said line of work devices, means effective upon the completion of the last-named movement of the respective cabinets to move the rearmost of the series of cabinets against said abutment whereupon each addition to the series of cabinets on said conveyor system will be brought into said position, means for elevating all of the cabinets of a series to bring them into desired horizontal relationship with said work devices, means for thereafter retracting said conveyor in preparation for the next advance of said series of cabinets and means for returning said cabinets to said conveyor without substantially disturbing the position thereof relative to said work devices.

6. Apparatus comprising, in combination, a succession of work stations having a fixed spacing one from the other along a single file, a conveyor system parallel to and coextensive with said file of work stations, means for supporting on said conveyor system a series of rectangular objects in predetermined spaced relationship one from the other, means for effecting a forward movement of said conveyor system to bring said objects to a position at which one of them is at one work station and the immediately rearward object is at the imediately rearward work station, means effective upon the termination of forward movement of said conveyor system to urge the said one object forwardly to present its leading edge in predetermined fixed relation to said one work station and to urge the said rearward object rearwardly to present its trailing edge in predetermined fixed relation to the said immediately rearward work station, and means including an elevator substantially coextensive with said conveyor for urging said objects in a direction angularly related to the direction of operation of said conveyor system to move said objects into desired operating positions at said work stations.

7. Apparatus comprising, in combination, a succession of work stations having a fixed spacing one from the other along a single file, a conveyor system parallel to and coextensive with said file of work stations, means for supporting on said conveyor system a series of rectangular objects in predetermined spaced relationship one from the other, means for effecting a forward movement of said conveyor system to bring said objects to a position at which one of them is at one work station and the immediately rearward object is at the immediately rearward work station, means effective upon the termination of forward movement of said conveyor system to urge the said one object forwardly to present its leading edge in predetermined fixed relation to said one work station and to urge the said rearward object rearwardly to present its trailing edge in predetermined fixed relation to the said immediately rearward work station, means for removing said objects from the said conveyor system without disturbing the established relationship of said objects to said work stations, means for urging said objects in a direction angularly related to the direction of operation of said conveyor system to move said objects into desired operating positions at said work stations, and means for returning said conveyor system in preparation for a succeeding advance of said objects.

8. Apparatus comprising means providing a succession of work stations longitudinally spaced apart in a single file, work devices arranged in longitudinally spaced-apart pairs at each of said work stations, means for conducting objects in succession along a line of travel parallel to said line of work stations to present pairs of said objects successively at each of said work stations, and means for aligning each object of a pair relative to a work device at said station whereby the said work devices may simultaneously perform a work operation on one object of the pair at a location thereon bearing a fixed relation to the leading edge of said object and on the other object of the pair at a location bearing a fixed relation to the trailing edge thereof.

9. The method of performing manufacturing operations at each of a succession of work stations spaced longitudinally, on refrigerator cabinets or the like in which in a quantity of cabinets to be worked on may differ one from the other in width, which method includes the steps of aligning the cabinets to effect a common orientation of the width dimension, presenting successively at each of the work stations a pair of cabinets in spaced apart relation considered with respect to the direction of travel, effecting a return movement of the forward cabinet at each station and a forward movement of the immediately following cabinet at the station to align the trailing edge of the respective forward cabinets and the leading edge of the respective following cabinets in predetermined fixed relation to the said work station occupied thereby, and performing work operations on each cabinet at locations thereon bearing a fixed relation to the respective trailing and leading edges.

10. The method of manufacturing refrigerator cabinets or the like in which one cabinet differs from the other in a common dimension, which comprises aligning a succession of cabinets in a manner in which the varying dimension of the respective cabinets is commonly oriented, advancing the cabinets in sequence from one to the next of a series of fixed work stations while maintaining the orientation thereof, at one of the work stations moving one of the cabinets relative to the immediately rearward one to position a leading edge of said leading cabinet at the station in predetermined position relative to the work station and to position a trailing edge of the following cabinet in predetermined position relative to the immediately rearward work station, whereby regardless of the dimensional difference of the cabinets the respective trailing and leading edges thereof have a specific space relationship to the associated work station, performing a work operation on the leading cabinet at a location related to the said leading edge thereof and on the following cabinet at a location related to the trailing edge thereof, and repeating the aforesaid space adjustment as the former following cabinet is brought to the next work station to become the leading cabinet thereat and a new follower cabinet is brought to the immediately rearward work station, to thereby effect work operations in specific relationship to each of the leading and trailing edges of each cabinet in succession.

11. The method of performing manufacturing operations sequentially on a succession of refrigerator cabinets or the like in which the cabinets in the succession may differ one from another in width, which includes the steps of aligning the cabinets in a manner in which the width dimension is commonly oriented, periodically advancing the cabinets as a group for a distance at least equal to the width of the maximum cabinet in the series to position each cabinet in turn at a work station, effecting a further advance of any cabinet appearing for the first time at a particular work station as necessary to position the leading edge of said cabinet in a predetermined fixed relation to said work station, performing a work operation on said cabinet at a location thereon in fixed relation to said leading edge, advancing said cabinets as a group for the aforesaid distance, effecting a return movement of each cabinet on which a leading edge operation had been performed to position the trailing edge thereof in a fixed position relative to the work station, and performing a work operation on the said trailing edge.

12. The method of manufacturing refrigerator cabinets or the like, which includes the steps of advancing cabinets in sequence from one to the next of a series of work stations, moving each of two adjacent cabinets in opposite directions to position a trailing wall of one of the two cabinets and a leading wall of the other of the two cabinets respectively in a predetermined space relationship at each of two adjacent work stations, and at the respective work stations performing a work operation at a location on one cabinet related to the said trailing wall thereof and a work operation on the other cabinet at a location thereon related to the said leading wall thereof, whereupon after each of the cabinets has been presented to two successive work stations each cabinet will have had performed thereon the identical work operations at the respective leading and trailing walls thereof.

No references cited.